(12) United States Patent
Yeh et al.

(10) Patent No.: US 8,705,968 B2
(45) Date of Patent: Apr. 22, 2014

(54) OPTICAL FIBER COMMUNICATION SYSTEM AND METHODS HAVING A REFLECTIVE OPTICAL NETWORK UNIT

(75) Inventors: Chien-Hung Yeh, Hsinchu (TW); Chi-Wai Chow, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 395 days.

(21) Appl. No.: 13/276,042

(22) Filed: Oct. 18, 2011

(65) Prior Publication Data

US 2012/0328295 A1  Dec. 27, 2012

(30) Foreign Application Priority Data

Jun. 24, 2011 (TW) .............................. 100122129 A

(51) Int. Cl.
*H04J 14/00* (2006.01)
*H04B 10/25* (2013.01)

(52) U.S. Cl.
USPC .............................. 398/67; 72/167.5; 72/170

(58) Field of Classification Search
USPC .................................. 398/67, 72, 167.5, 170
See application file for complete search history.

(56) References Cited

U.S. PATENT DOCUMENTS

| | | | | |
|---|---|---|---|---|
| 5,608,565 A | * | 3/1997 | Suzuki et al. ................. | 359/237 |
| 5,815,295 A | * | 9/1998 | Darcie et al. .................... | 398/72 |
| 6,111,678 A | | 8/2000 | Mathoorasing et al. | |
| 6,137,611 A | | 10/2000 | Boivin et al. | |
| 7,680,416 B2 | * | 3/2010 | Hann et al. ...................... | 398/85 |
| 7,965,947 B2 | * | 6/2011 | Yu et al. ......................... | 398/185 |
| 2006/0182446 A1 | | 8/2006 | Kim et al. | |
| 2009/0269059 A1 | * | 10/2009 | Genay et al. .................... | 398/43 |

FOREIGN PATENT DOCUMENTS

| | | |
|---|---|---|
| JP | 1997215048 A | 8/1997 |
| JP | 1998084322 A | 3/1998 |
| JP | 1998200484 A | 7/1998 |
| JP | H11163794 A | 6/1999 |
| JP | 2000196536 A | 7/2000 |
| JP | 2002190778 A | 7/2002 |
| JP | 2003124893 A | 4/2003 |
| JP | 2003169021 A | 6/2003 |

(Continued)

OTHER PUBLICATIONS

Tomoaki Yoshida et al.; "A New Single-Fiber 10-Gb/s Optical Loopback Method Using Phase Modulation for WDM Optical Access Networks"; Journal of Lightwave Technology, vol. 24, No. 2, Feb. 2006.

(Continued)

*Primary Examiner* — Nathan Curs
(74) *Attorney, Agent, or Firm* — Wang Law Firm, Inc.; Li K. Wang; Stephen Hsu

(57) ABSTRACT

An optical fiber communication system is provided, including a central office and an optical network unit. The central office generates a first downstream signal and a second downstream signal according to a radio frequency signal and a baseband signal, respectively. The optical network unit is coupled to the central office to receive the first downstream signal and the second downstream signal through a first fiber and a second fiber different from the first fiber, respectively, such that the optical network unit only modulates the second downstream signal to generate an upstream signal and then delivers the upstream signal to the central office through the first fiber, thereby decreasing signal Rayleigh backscatter noise.

18 Claims, 6 Drawing Sheets

(56) References Cited

FOREIGN PATENT DOCUMENTS

| JP | 2007067663 A | 3/2007 |
|----|--------------|--------|
| JP | 2007143160 A | 6/2007 |
| JP | 2009545197 A | 12/2009 |

OTHER PUBLICATIONS

Zhihong Li et al.; "A Novel PSK-Manchester Modulation Format in 10-Gb/s Passive Optical Network System and High Tolerance to Beat Interference Noise"; IEEE Photonics Technology Letters, vol. 17, No. 5, May 2005.

C. H. Wang et al.; "Rayleigh Noise Mitigation Using Single-Sideband Modulation Generated by a Dual-Parallel MZM for Carrier Distributed PON"; IEEE Photonics Technology Letters, vol. 22, No. 11, Jun. 1, 2010.

Chun Tin Lin et al.; "Simultaneous Modulation and Transmission of FTTH Baseband and Radio Signals on a Single Wavelength", 2007.

Office Action of corresponding TW application, published on Oct. 21, 2013.

C. W. Chow et al., "Rayleigh noise mitigation in DWDM LF-PONs using carrier suppressed subcarrier-amplitude modulated phase shift keying", Optics Express vol. 16, No. 3, pp. 1860-1866, Feb. 4, 2008.

C. W. Chow et al., "Rayleigh Backscattering Mitigation Using Wavelength Splitting for Heterogeneous Optical Wired and Wireless Access", IEEE Photonics Technology Letters, vol. 22, No. 17, pp. 1294-1296 Sep. 1, 2010.

Office Action of corresponding JP application, issued on Jul. 8, 2013.

\* cited by examiner

OPTICAL FIBER COMMUNICATION SYSTEM AND METHODS HAVING A REFLECTIVE OPTICAL NETWORK UNIT

CROSS REFERENCE TO RELATED APPLICATIONS

This application claims priority of Taiwan Patent Application No. 100122129, filed on Jun. 24, 2011, the entirety of which is incorporated by reference herein.

BACKGROUND OF THE INVENTION

1. Field of the Invention

The present invention relates to optical fiber communication systems, and in particular relates to an optical fiber communication system having a reflective optical network unit.

2. Description of the Related Art

FIG. 1A is a diagram of an optical fiber communication system. As shown in FIG. 1A, the optical fiber communication system 100 is a wavelength-division multiplexing-passive optical network (WDM-PON) system. The plurality of the laser sources L1, L2 ... Ln in the central office (CO) 110 (or called head-end) respectively generate light sources having different wavelengths $\lambda 1, \lambda 2, \ldots \lambda n$. The light sources are integrated into an optical carrier DS by the optical multiplexer 111 of the array wave guide (AWG). The multiplexer 111 is coupled to an optical circulator 112. The first terminal of the optical circulator 112 receives the optical carrier DS and delivers the optical carrier DS to the fiber 113 coupled to the second terminal of the optical circulator 112. The third terminal of the optical circulator 112 is coupled to the optical demultiplexer 114 of the central office 110. The optical demultiplexer 114 delivers the upstream signal US to a corresponding receiver 115 by the fiber 113 and the optical circulator 112.

In addition, the optical carrier DS is separated by an optical demultiplexer 121 into user devices (e.g., user device 122). A reflective optical network unit (RONU) 120 having at least one reflective modulator 123 is established, in which the reflective modulator 123 reuses the optical carrier DS and delivers the upstream signal US of the client to the receiver 115 of the central office 110.

However, the cross-sectional area of the fiber becomes an ellipse shape due to manufacturing process or procedures for establishing an optical fiber communication system. Thus an optical fiber communication system with loop back network structures may more easily generate interference noise from Rayleigh backscatter (RB) effect, which especially affects the transmission of the upstream data. In a nutshell, the portions of the light signal or the radio frequency signal delivered in fibers are constantly reflected by the fibers. Finally, the reflected signals delivered to the receiver 115 of the central office 110 become Rayleigh backscatter noise.

FIG. 1B is another diagram of the optical fiber communication system of FIG. 1A. As shown in FIG. 1B, carrier Rayleigh backscattering CRB and signal Rayleigh backscattering SRB are two main types of Rayleigh backscatter noises. Carrier Rayleigh backscattering CRB is generated by the optical carrier DS, and signal Rayleigh backscattering SRB is generated by the upstream signal US. The carrier Rayleigh backscattering CRB is generated by the process where the optical carrier DS is delivered from the central office 110 to the optical demultiplexer 121. The signal Rayleigh backscattering SRB is generated by the process where the Rayleigh backscattering RB, generated when the optical carrier DS is delivered from the central office 110 to the optical demultiplexer 121, is modulated again by the reflective modulator 123 of the reflective optical network unit 120 and then delivered to the receiver 115 of the central office 110.

Therefore, there is a need for an optical fiber communication system to decrease the carrier Rayleigh backscattering CRB and the signal Rayleigh backscattering SRB for improving a signal transmission.

BRIEF SUMMARY OF THE INVENTION

In light of the previously described problems, the invention provides an embodiment of an optical fiber communication system, including a central office and an optical network unit. The central office generates a first downstream signal and a second downstream signal according to a radio frequency signal and a baseband signal, respectively. The optical network unit is coupled to the central office to receive the first downstream signal and the second downstream signal through a first fiber and a second fiber different from the first fiber, respectively, such that the optical network unit only modulates the second downstream signal to generate an upstream signal and then delivers the upstream signal to the central office through the first fiber, thereby decreasing signal Rayleigh backscatter noise.

The disclosure also provides a method for optical fiber communication. The method for optical fiber communication includes the steps of: generating a first downstream signal and a second downstream signal according to a radio frequency signal and a baseband signal, respectively; respectively outputting the first downstream signal and the second downstream signal through a first fiber and a second fiber to an optical network unit, wherein the first fiber is different from the second fiber; and only modulating the second downstream signal to generate an upstream signal to a central office through the first fiber, thereby decreasing signal Rayleigh backscatter noise.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
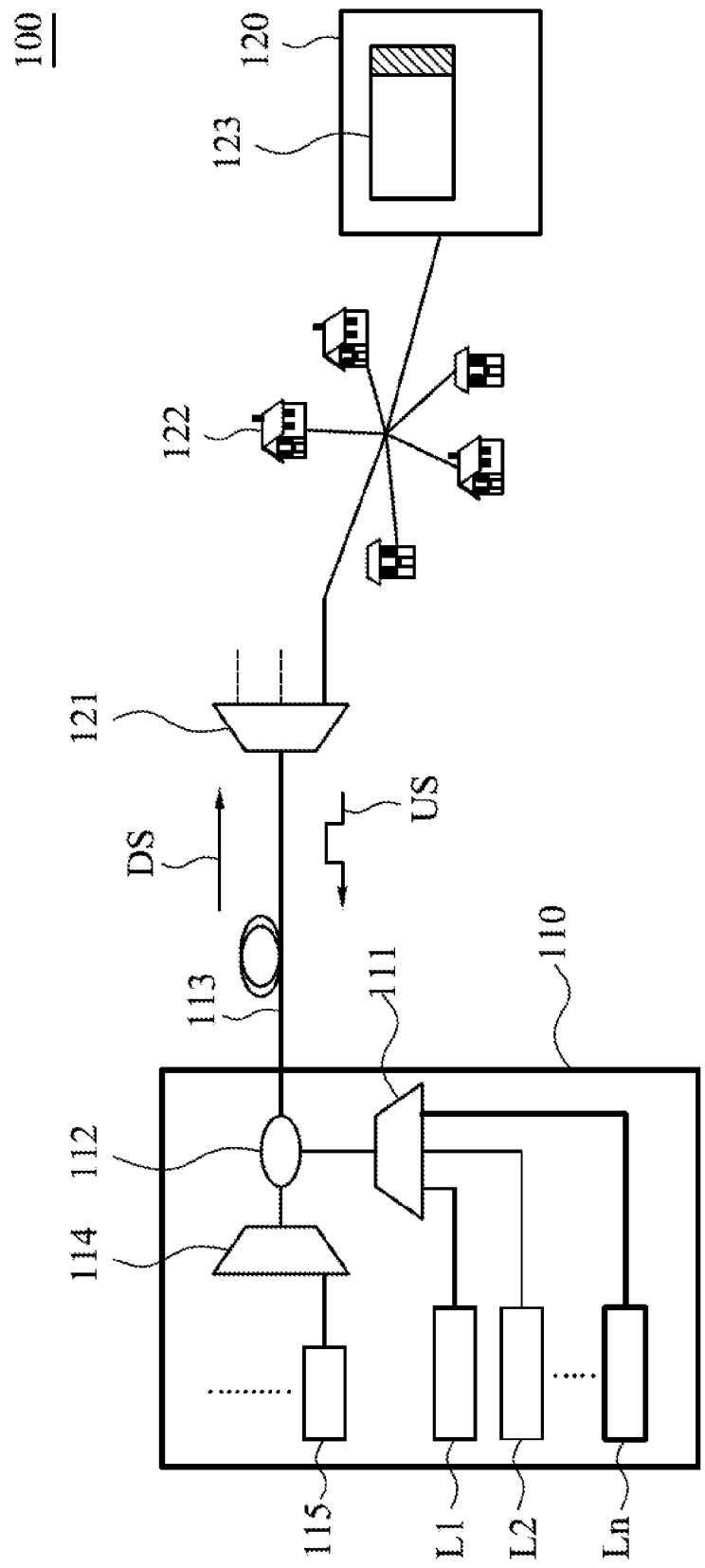
FIG. 1A is a diagram of an optical fiber communication system.
Figure 1B:
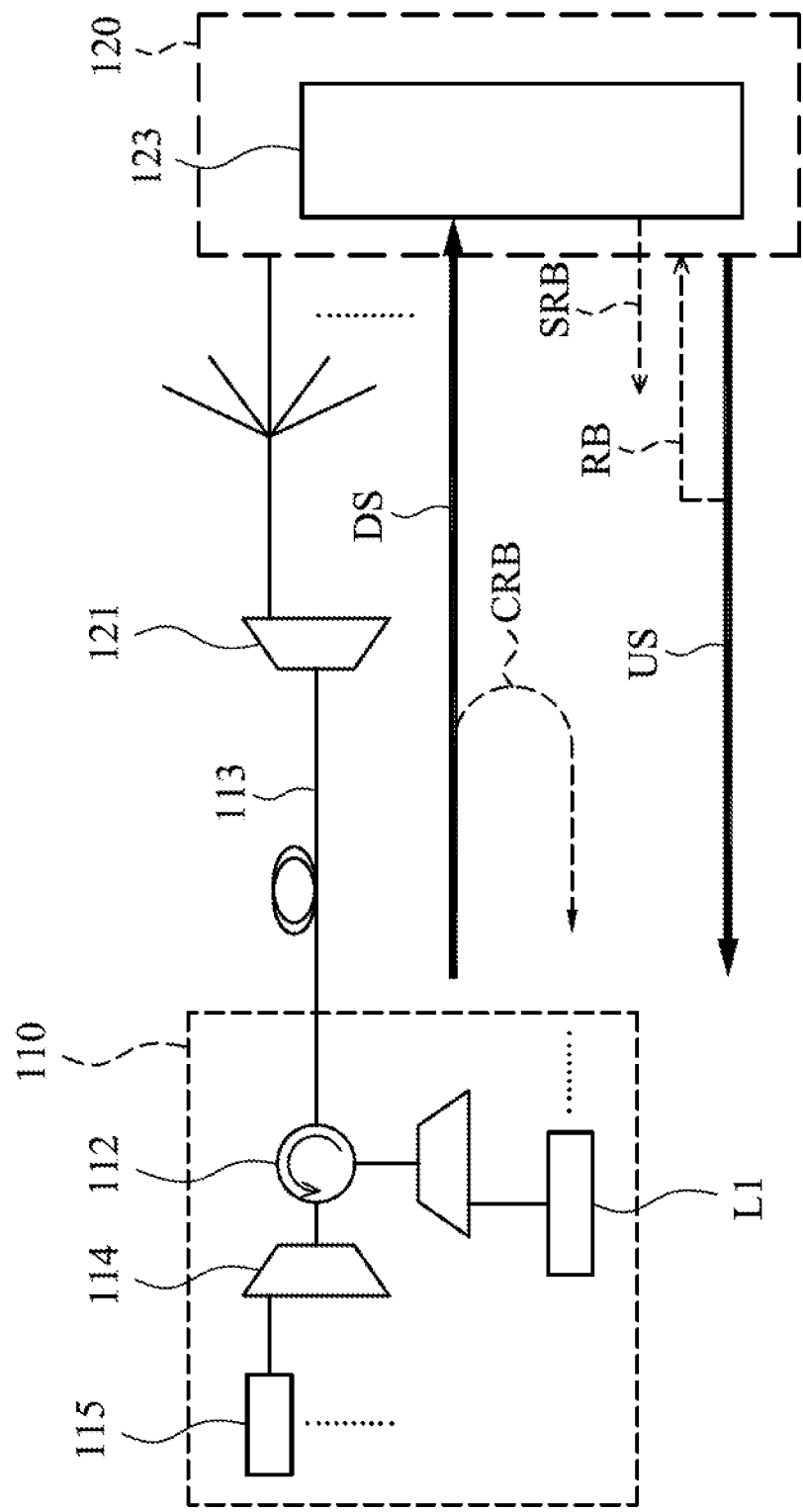
FIG. 1B is another diagram of the optical fiber communication system of? FIG. 1A.
Figure 2:
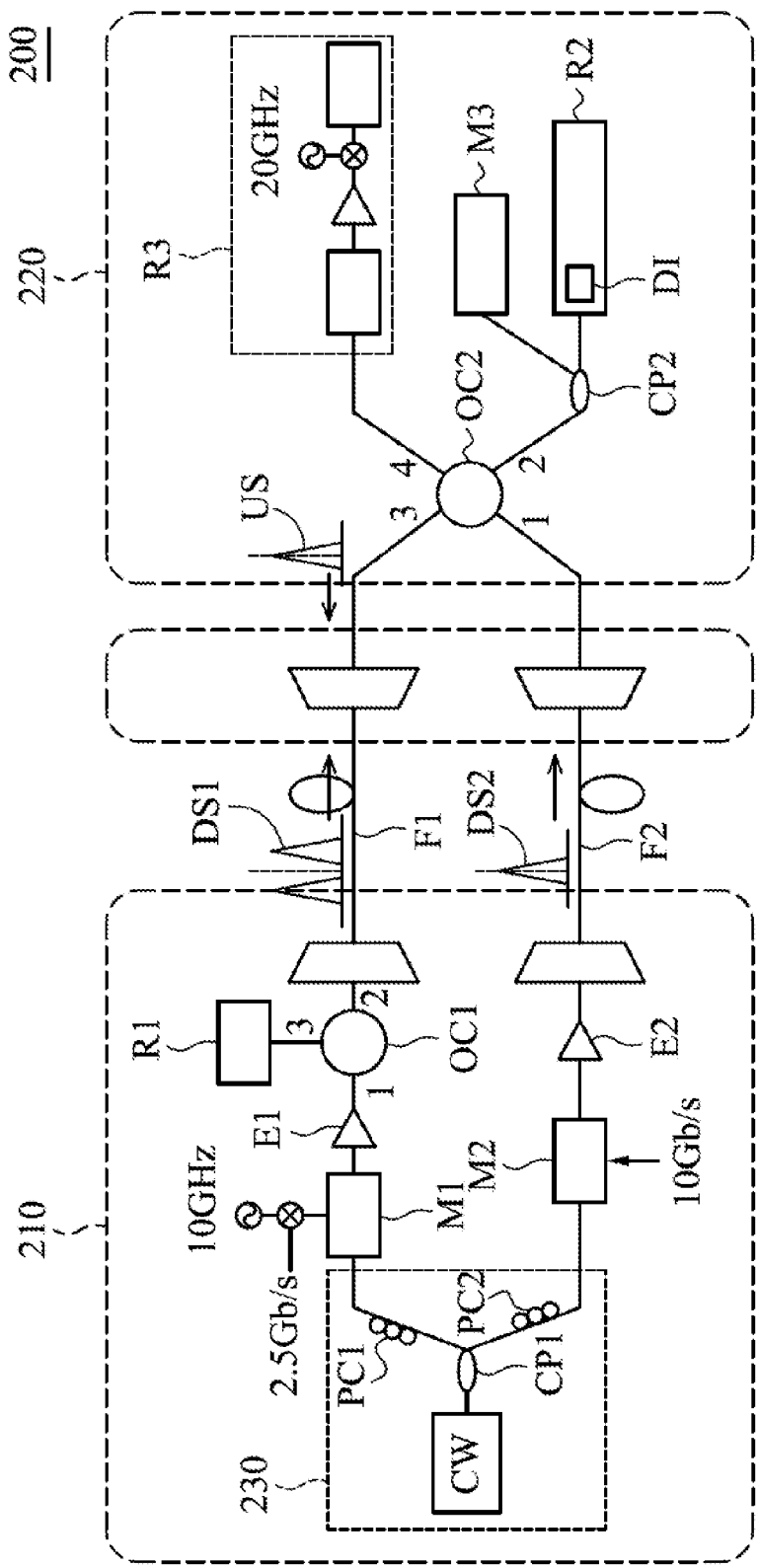
FIG. 2 illustrates an embodiment of an optical fiber communication system.

FIG. 2 illustrates an embodiment of an optical fiber communication system. As shown in FIG. 2, the optical fiber communication system 200 includes a central office (CO) 210 and an optical network unit (ONU) 220. For example, the central office 210 generates a first downstream signal DS1 and a second downstream signal DS2 according to a radio frequency signal (RF signal) and a baseband signal, respectively. The optical network unit 220 is coupled to the central office to receive the downstream signal DS1 and the downstream signal DS2 through a fiber F1 and a fiber F2 different from the fiber F1, respectively, such that the optical network unit 220 only modulates the downstream signal DS2 to generate an upstream signal US and then delivers the upstream signal US to the central office 210 through the fiber F1, thereby decreasing signal Rayleigh backscatter noise.

In detail, the central office 210 comprises a light generating unit 230, an electro-optical modulator M1, a phase modulator M2, an optical circulator OC1 and an uplink receiving unit R1. For example, the light generating unit 230 outputs a light source signal, in which the light generating unit 230 comprises a light source CW, an optical coupler CP1 and polarization controllers PC1 and PC2. The optical coupler CP1 outputs the light source signal to the electro-optical modulator M1 and phase modulator M2, respectively.

The electro-optical modulator M1 generates the downstream signal DS1 according to the radio frequency signal, a sine wave signal and the light source signal. In detail, in this embodiment, the electro-optical modulator M1 is a Mach-Zehnder modulator and modulates the light source signal to a double-sideband (DSB) signal with optical carrier suppression (OCS) according the radio frequency signal (e.g., 2.5 Gb/s) and the sine wave signal (e.g., 10 GHz), in which the frequency of the double-sideband signal is 20 GHz (i.e., downstream signal DS1). The downstream signal DS1 and the upstream signal US are on-off keying (OOK) signals. The phase modulator M2 modulates the light source signal to generate the downstream signal DS2 according to the baseband signal (e.g., 10 Gb/s), in which the downstream signal DS2 is a differential phase shift keying (DPSK) signal.

The optical circulator OC1 outputs the downstream signal DS1 and receives the upstream signal US. In detail, a first terminal of the optical circulator OC1 is coupled to the electro-optical modulator M1 to receive the downstream signal DS1. A second terminal of the optical circulator OC1 is coupled to a third terminal of the optical circulator OC2 of the optical network unit 220 to output the downstream signal DS1 to the optical circulator OC2, and receive the upstream signal US from the optical network unit 220. A third terminal of the optical circulator OC1 is coupled to an uplink receiving unit R1 to output the upstream signal US to the uplink receiving unit R1. In addition, the Erbium doped fiber amplifiers (EDFA) E1 and E2 amplify the downstream signals DS1 and DS2, respectively.

In this embodiment, the optical network unit 220 is a reflective optical network unit. The optical network unit 220 includes a reflective modulator M3, an optical circulator OC2, a baseband receiving unit R2, an optical coupler CP2 and a radio frequency receiving unit R3. In detail, the reflective modulator M3 modulates the downstream signal DS2 to generate the upstream signal US. In this embodiment, the reflective modulator M3 is a reflective semiconductor optical amplifier (RSOA).

The optical circulator OC2 receives the downstream signals DS1 and DS2, respectively, and outputs the upstream signal US to the central office 210. In detail, a first terminal of the optical circulator OC2 is coupled to the fiber F2 to receive the downstream signal DS2. A second terminal of the optical circulator OC2 is coupled to the reflective modulator M3 to output the downstream signal DS2 to the reflective modulator M3 and receive the upstream signal US. A third terminal of the optical circulator OC2 is coupled to the fiber F1 to receive the downstream signal DS1 and output the upstream signal US to the central office 210. A fourth terminal of the optical circulator OC2 outputs the downstream signal DS1 to the radio frequency receiving unit R3.

A first terminal of the optical coupler CP2 is coupled to the second terminal of the optical circulator OC2 to receive the downstream signal DS2. A second terminal and a third terminal of the optical coupler CP2 output the downstream signal DS2 to the baseband receiving unit R2 and the reflective modulator M3, respectively The baseband receiving unit R2 receives the downstream signal DS2, in which the baseband receiving unit R2 includes a delay interferometer DI demodulating the downstream signal DS2. The radio receiving unit R3 is coupled to the fourth terminal of the optical circulator OC2 to receive the downstream signal DS1.

Note that signals inputted to the first terminal of the optical circulator OC2 are only outputted from the second terminal of the optical circulator OC2. Similarly, signals inputted to the second terminal of the optical circulator OC2 are only outputted from the third terminal of the optical circulator OC2, and signals inputted to the third terminal of the optical circulator OC2 are only outputted from the fourth terminal of the optical circulator OC2. In other words, signals inputted to the third terminal of the optical circulator OC2 are not outputted from the first terminal, the second terminal or the third terminal of the optical circulator OC2. The optical circulator OC1 has the same feature as the optical circulator OC2, thus, the illustration of the optical circulator OC1 which is the same as the illustration of the optical circulator OC2 is omitted for brevity. Therefore, the Rayleigh backscatter noise generated by the upstream signal can not be outputted to the reflective modulator M3 through the second terminal of the optical circulator OC2, thereby preventing the generation of signal Rayleigh backscatter noise.

In general, by the use of two different fibers F1 and F2 respectively delivering the downstream signals DS1 and DS2 in this embodiment, Rayleigh backscatter noise generated by the upstream signal US can not be outputted to the reflective modulator M3 through the second terminal of the optical circulator OC2. Therefore, the reflective modulator M3 can not reflect the Rayleigh backscatter noise generated by the upstream signal US, thereby decreasing the generation of signal Rayleigh backscatter noise.

Figure 3:
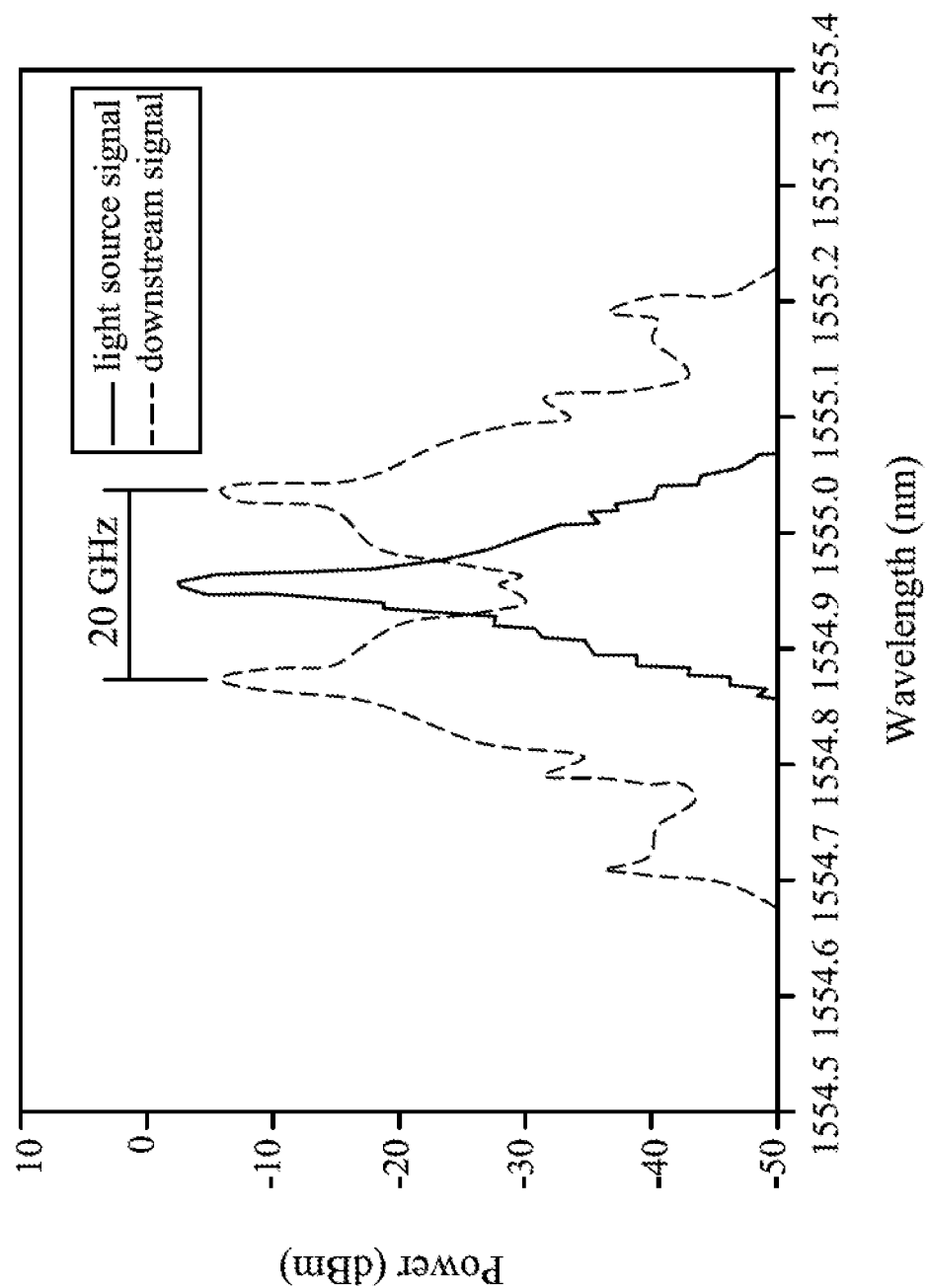
FIG. 3 illustrates a waveform of the light source signal and the downstream signal DS1 of the disclosure.

FIG. 3 illustrates a waveform of the light source signal and the downstream signal DS1 of the disclosure. As shown in FIG. 3, the light source signal is a continuous wave and the central wavelength of the light source signal is 1550 nm. The downstream signal DS1 is a double-sideband (DSB) signal with optical carrier suppression (OCS) and the frequency of the downstream signal DS1 is 20 GHz.

Figure 4:
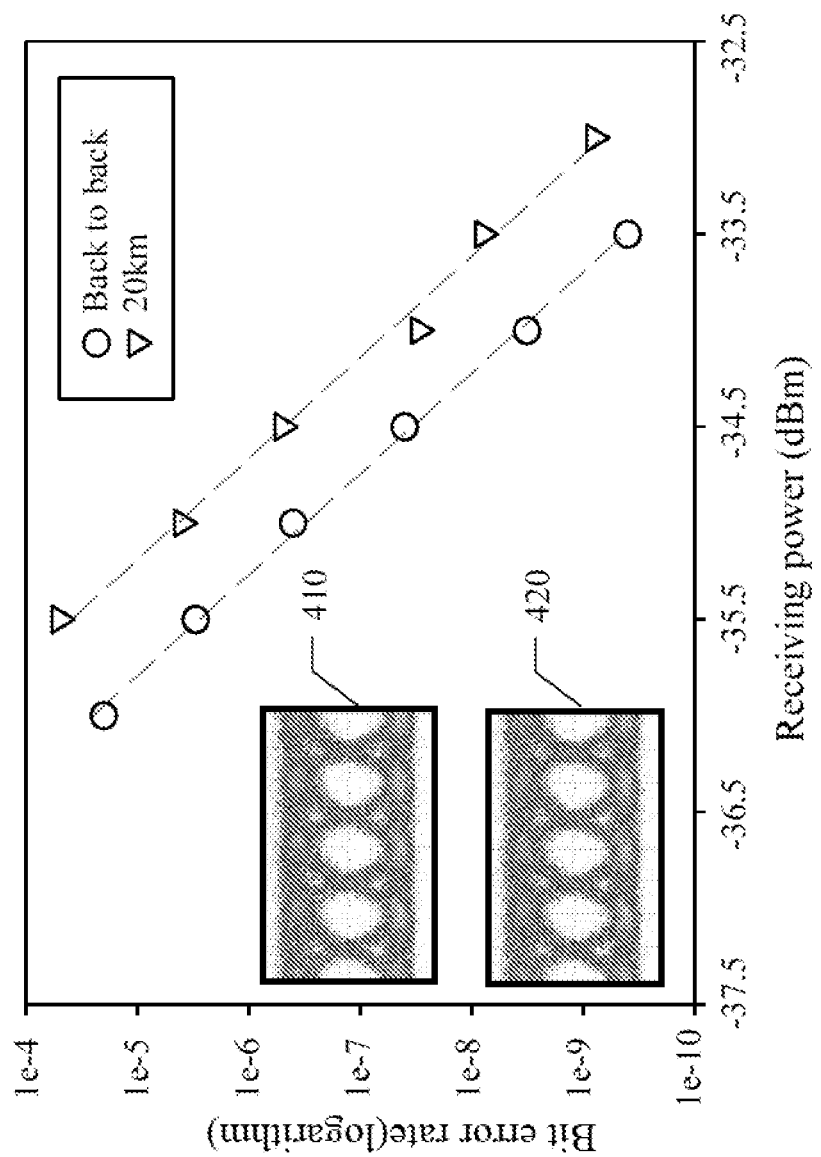
FIG. 4 shows an embodiment of the relationship between power and the bit error rate (BER) of the upstream signal US.

FIG. 4 shows an embodiment of the relationship between power and the bit error rate (BER) of the upstream signal US. As shown in FIG. 4, the horizontal axis is the receiving power (The amount of the receiving power is indicated by the unit of dBm). The vertical axis is the bit error rate indicated by logarithm. The line with circular markers is the bit error rate of the upstream signal US in the optical network unit 220. The line with triangular markers is the bit error rate of the upstream signal US which has delivered 20 km. Thus, the bit error rate has decreased along with increase of the received power measured by the receiver. In addition, the subgraph 410 is the eye diagram of the upstream signal US in the back to back transmission (i.e., in the optical network unit 220). The subgraph 420 is the eye diagram of the upstream signal US which has delivered 20 km. The subgraph 420 shows that the center of the eye diagram is still very clear. It can be seen that this embodiment can decrease the generation of Rayleigh backscatter noise.

Figure 5:
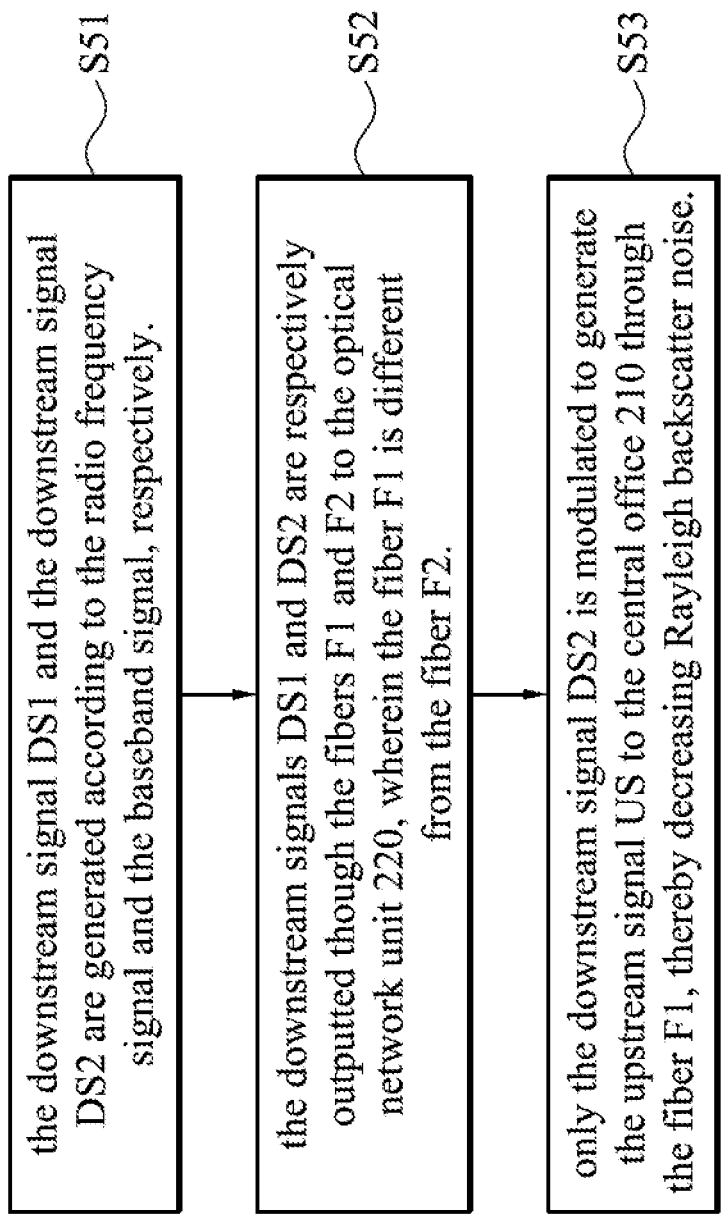
FIG. 5 illustrates a sequence diagram of a method for optical fiber communication.

FIG. 5 illustrates a sequence diagram of a method for optical fiber communication. As shown in FIG. 5, the method for optical fiber communication includes the following steps.

In step S51, the downstream signal DS1 and the downstream signal DS2 are generated according to the radio frequency signal and the baseband signal, respectively. In step S52, the downstream signals DS1 and DS2 are respectively outputted through the fibers F1 and F2 to the optical network unit 220, wherein the fiber F1 is different from the fiber F2. In step S53, only the downstream signal DS2 is modulated to generate the upstream signal US to the central office 210 through the fiber F1, thereby decreasing signal Rayleigh backscatter noise.

The foregoing has outlined features of several embodiments so that those skilled in the art may better understand the detailed description that follows. Those skilled in the art should appreciate that they may readily use the present disclosure as a basis for designing or modifying other processes and/or structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An optical fiber communication system, comprising
a central office, generating a first downstream signal and a second downstream signal according to a radio frequency signal and a baseband signal, respectively; and
an optical network unit, coupled to the central office to receive the first downstream signal and the second downstream signal through a first fiber and a second fiber different from the first fiber, respectively, such that the optical network unit only modulates the second downstream signal to generate an upstream signal and then delivers the upstream signal to the central office through the first fiber, thereby decreasing signal Rayleigh backscatter noise.

2. The optical fiber communication system as claimed in claim 1, wherein the optical network unit comprises:
a reflective modulator, modulating the second downstream signal to generate the upstream signal; and
a first optical circulator, having a first terminal coupled to the second fiber to receive the second downstream signal, a second terminal coupled to the reflective modulator to output the second downstream signal to the reflective modulator and receive the upstream signal, a third terminal coupled to the first fiber to receive the first downstream signal and output the upstream signal to the central office, and a fourth terminal to output the first downstream signal.

3. The optical fiber communication system as claimed in claim 2, wherein the optical network unit further comprises:
a baseband receiving unit;
a optical coupler, having a first terminal coupled to the second terminal of the first optical circulator to receive the second downstream signal, and a second terminal and a third terminal to output the second downstream signal to the baseband receiving unit and the reflective modulator, respectively; and
a radio frequency receiving unit, coupled to the fourth terminal of the first circulator to receive the first downstream signal.

4. The optical fiber communication system as claimed in claim 3, wherein the baseband receiving unit comprises a delay interferometer demodulating the second downstream signal.

5. The optical fiber communication system as claimed in claim 2, wherein the reflective modulator is a reflective semiconductor optical amplifier.

6. The optical fiber communication system as claimed in claim 2, wherein the central office comprises:
a light generating unit, outputting a light source signal;
an electro-optical modulator, generating the first downstream signal according to the radio frequency signal, a sine wave signal and the light source signal; and
a phase modulator, generating the second downstream signal according to the light source signal and the baseband signal.

7. The optical fiber communication system as claimed in claim 6, wherein the central office further comprises:
a second optical circulator, having a first terminal coupled to the electro-optical modulator to receive the first downstream signal, a second terminal coupled to the third terminal of the first optical circulator to output the first downstream signal to the first optical circulator, and a third terminal coupled to an uplink receiving unit.

8. The optical fiber communication system as claimed in claim 6, wherein the electro-optical modulator is a Mach-Zehnder modulator.

9. The optical fiber communication system as claimed in claim 1, wherein the first downstream signal and the upstream signal are on-off keying signals, and the second downstream signal is a differential phase shift keying signal.

10. The optical fiber communication system as claimed in claim 1, wherein the first downstream signal is a double-sideband signal with optical carrier suppression.

11. A method for optical fiber communication, comprising
generating a first downstream signal and a second downstream signal according to a radio frequency signal and a baseband signal, respectively;
respectively outputting the first downstream signal and the second downstream signal through a first fiber and a second fiber to an optical network unit, wherein the first fiber is different from the second fiber; and
only modulating the second downstream signal to generate an upstream signal to a central office through the first fiber, thereby decreasing signal Rayleigh backscatter noise.

12. The method as claimed in claim 11, wherein the second downstream signal is delivered to a reflective modulator by a first optical circulator and then modulated to generate the upstream signal, and the upstream signal is delivered to the central office by the first optical circulator, and the first downstream signal is delivered to a radio frequency receiving unit by the first optical circulator.

13. The method as claimed in claim 12, wherein the second downstream signal is received and demodulated by a baseband receiving unit.

14. The method as claimed in claim 12, wherein the reflective modulator is a reflective semiconductor optical amplifier.

15. The method as claimed in claim 11, wherein, the first downstream signal is generated by an electro-optical modulator according to the radio frequency signal, a sine wave signal and a light source signal, and the second down stream signal is generated by a phase modulator according to the light source signal and the baseband signal.

16. The method as claimed in claim 15, wherein the electro-optical modulator is a Mach-Zehnder modulator.

17. The method as claimed in claim 11, wherein the first downstream signal and the upstream signal are on-off keying signals, and the second downstream signal is a differential phase shift keying signal.

18. The method as claimed in claim 11, wherein the first downstream signal is a double-sideband signal with optical carrier suppression.

* * * * *